Jan. 31, 1967  G. M. HANSON ETAL  3,301,659
PELLET OF IRON ORE AND FLUX, APPARATUS
AND METHOD FOR MAKING SAME
Original Filed Oct. 5, 1961  3 Sheets-Sheet 1

Inventors
Glenn M. Hanson
Robert W. Frans
Glenn A. Heian
Eugene W. Price
By Arthur M. Streich
Attorney

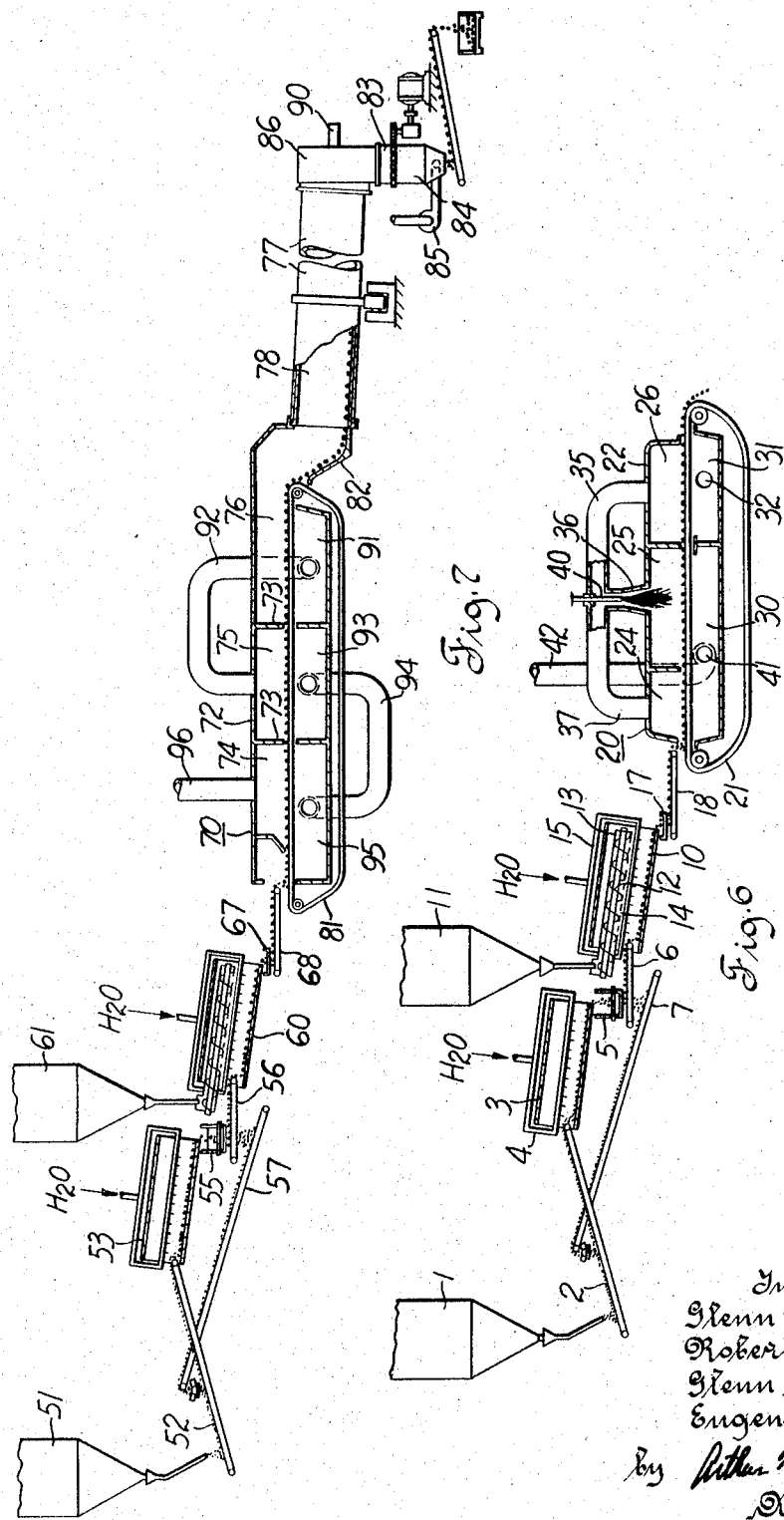

3,301,659
PELLET OF IRON ORE AND FLUX, APPARATUS AND METHOD FOR MAKING SAME

Glenn M. Hanson, Wauwatosa, Robert D. Frans, Brookfield, Glenn A. Heian, Franklin, and Eugene W. Price, West Allis, Wis., assignors to Allis-Chalmers Manufacturing Company, Milwaukee, Wis.
Original application Oct. 5, 1961, Ser. No. 143,097, now Patent No. 3,163,519, dated Dec. 29, 1964. Divided and this application Dec. 10, 1963, Ser. No. 329,517
3 Claims. (Cl. 75—5)

This is a division of a prior application now U.S. Patent 3,163,519, December 29, 1964.

This invention relates to a process for making a composite pellet having a core of iron ore and flux material surrounded by a coating of flux-free iron ore.

The most common way of producing metallic iron from iron ore involves charging iron ore into a blast furnace along with a fluxing material. The iron ore, which is an oxide of the elemental metal, is reduced to metallic iron by blowing high temperature reducing gases through the blast furnace. The fluxing material is used to promote fusion of impurities in the ore (such as alumina, silica, etc.) and to cause the fusion to take place at a lower temperature than is required to melt such materials by themselves. The fluxing material is usually limestone and/or dolomite. In recent years as reserves of high grade iron ore have become depleted increasing use has been made of relatively low grade ores. Such low grade ores are first ground, then concentrated and then made into water bound pellets. It has been the practice (as it is with this invention) to usually add about ½ percent bentonite to provide a stronger water bound pellet. Wet pellets are dried and burned to give them sufficient strength to withstand handling, shipping and charging into a blast furnace. A considerable load is applied when such pellets are placed in a blast furnace and come under the loading pressure of a tall column of the material. The pellets must have considerable strength when in the blast furnace to avoid the lower layers of pellets being crushed by the weight of pellets above them, which if permitted to occur would tend to make the charge impervious to the passage of reducing gases that must be blown through the charge to reduce it. Ores occuring in nature that are relatively free of fluxing material have been successfully agglomerated and burned to provide pellets of considerable strength that are satisfactory for charging a blast furnace. One such process that has been especially successful in producing pellets of outstanding strength and great density while also being sufficiently porous for efficient reduction in the blast furnace, is disclosed in U.S. Patent 2,925,336, William F. Stowasser, Jr., February 16, 1960. There are, however, iron ores occurring in nature that have small but relatively significant amounts of fluxing material in the ore as it is mined. No economically feasible way is known to remove such fluxing materials from iron ore in which it occurs naturally. Further, it may be considered desirable to have some or even all of the fluxing material needed to reduce iron ore, in the pellet when it is charged to the blast furnace. Having all of the fluxing material needed to reduce iron ore in the pellet itself has the obvious and economically significant advantage of requiring fewer components to be fed to a blast furnace. Furthermore, having the fluxing material right in the pellet provides a uniform distribution of flux and iron ore that can never be achieved by charging alternate layers of iron ore and fluxing material into a blast furnace. A pellet of both iron ore and flux that is heat hardened, as by the process of the aforementioned Stowasser patent, has the further advantage that when it enters the blast furnace the flux is in a calcined condition, therefore the heat requirements and consequently the coke rate of the blast furnace is reduced.

Because the inventors of the present invention knew that outstanding pellets of flux free iron had been produced according to the disclosure of the above identified Stowasser patent, they first attempted to similarly treat pellets having fluxing material uniformly distributed throughout the pellet. Such pellets were fed through such a machine as also disclosed in the Stowasser patent, such a machine being the earlier invention of Dr. Otto G. Lellep (U.S. Patent 2,466,601, granted April 5, 1949). These early attempts to harden a pellet of iron ore and flux were not entirely satisfactory because of a build-up of a ringlike deposit on the interior surface of the kiln. In pilot plant operation such ring build-up was found to be of such magnitude as to require removal of this deposit after 24 hours operation. It was initially considered that such a build-up of a ring within the kiln resulted from the physical change that occurred when dust particles of the iron ore tumbling in the kiln fell through the heating flame in the kiln and were thereby melted to a liquid state which was followed by the liquid sticking to the interior of the kiln and building up a ring therein. Continued investigation, however, lead the inventors to conclude that the ring built-up was not the result of that phenomenon alone. That is, the ring build-up was discovered to result from heating the iron ore (with its impurities) and the flux, which formed slag at a temperature below the temperature required to burn and heat harden the pellets. The inventors considered the approach of eliminating the ring build-up problem by removing the slag forming consistuents from the iron ore. This approach, however, is not economically practical. Since it is necessary to live with the fact that there will be slag forming constituents in the ore, having the fluxing material in the pellet is extremely desirable from the standpoint of requiring fewer components to be charged to a blast furnace.

It was for a time considered by the inventors that ring build-up be accepted as an inevitable phenomenon and they turned their attention to possible means of removing the ring after it had built up. Further studies revealed, however, that the most serious ring build-up will occur somewhere in the vicinity of 80 feet from the discharge end of the kiln in a commercial size machine of this type. It was found that no practical boring bar arrangements to cut out the ring are available that will be effective more than 40 feet from the discharge end of a kiln unless a major shutdown of the plant is first accomplished.

The next stage of the development occurred when the inventors decided to try to trap within the pellet itself the materials that achieve a liquid state. It was established by tests that the build-up of ring within the kiln was in fact caused by slag material bleeding from the pellets. Thus the inventors concluded that if the liquid slag (which forms before the temperature is reached that is required to harden the pellet), could be trapped within the pellet and prevented from bleeding out, the problem of ring build-up in the kiln could be eliminated or so substantially reduced in magnitude so as to be no significant disadvantage to plant operation. The inventors then decided upon a composite pellet made up of a core surrounded by a coating, with the core being a mixture of iron ore and flux and the coating being iron substantially free of flux or other relatively low melting point constituents. The idea of coating a core to provide a composite pellet is not a new idea in this and many other arts. However, the pellet developed by the present inventors and the process and equipment for producing it is unique in several ways not heretofore considered or obvious to those skilled in this art.

For example, in one practice of the present invention, water bound composite pellets of one-half inch diameter are made each having a ⅜ inch core surrounded by a coating ¹⁄₁₆ inch thick. The ⅜ inch core comprises approximately 50 percent by volume of the composite pellet. The inner core consists of a mixture of iron ore and fluxing material and the outer coating is composed of only flux-free iron ore. The material made into the core in this example is a mixture that is by weight 32 percent flux to 68 percent iron ore. This core material is ground to a size of 100 percent minus 14 mesh (the ore being an iron ore concentrate) and rolled into cores ⅜ inch in diameter. The cores are then rolled in flux-free ore to apply the ¹⁄₁₆ inch flux-free iron ore coating packed to the degree that the coating is permeable to vapor and $CO_2$ but substantially impermeable to liquids of the viscosity of molten slag. The dimension and proportion described provide a composite pellet in which there is by weight 16 percent flux to 84 percent iron ore, which for the particular ore involved was the desired relationship for blast furnace feed in order to flux not only the siliceous component of the iron but also the siliceous component (the ash) in the coke required for reduction. The described pellets are then dried at a rate that is fast enough to vaporize the moisture within the inner core and permit the vapor to escape through the outer coating but the rate is also slow enough to heat escaping vapor only to a pressure below that which will fracture the coating. Then, after the vapors have escaped, the pellets are further heated to a temperature above the drying temperature but below the incipient melting temperature of the ore, to effect hardening of the pellets outer coating. It has been found desirable to maintain the maximum temperature of the pellets during this final hardening to approximately 2200–2400 degrees Fahrenheit since the incipient melting temperature of most iron ores is about 2500 degrees Fahrenheit.

With later reference to apparatus and microphotographs of pellets shown in the drawings, embodiments of the present inventions will be described that result in the production of hardened composite pellets that substantially eliminate any bleeding of liquid slag to the exterior of the pellet. With further reference to the drawings still further improvements and embodiments of the present inventions will be described that achieve even greater degrees of containment of liquid slag within the interior of the pellet. These accomplishments, of course, represent some of the primary objects of the invention.

Other important objects of the present invention include providing new and improved green water bound pellets, heat hardened pellets, pellets having iron in easily reducible forms, methods and apparatus all leading toward improving overall techniques for processing and converting mineral ores into more useful forms.

Other and more specific objects and how they are achieved will appear from the following description when read together with the accompanying drawings, in which:

FIG. 6 is an embodiment of apparatus according to the present invention; and

FIG. 7 is an embodiment of another embodiment of apparatus according to the present invention.

Figures 1, 2:
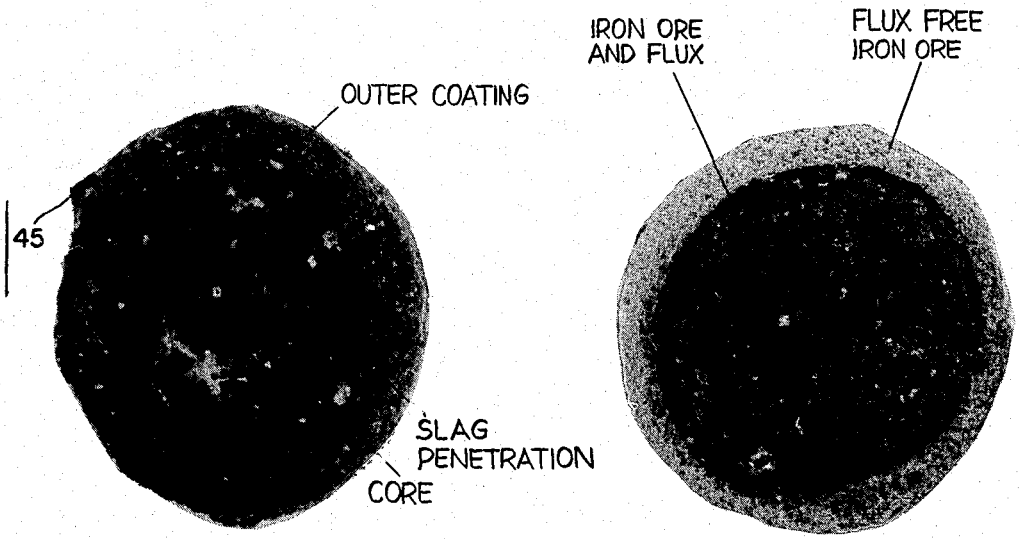
FIG. 1 is a photograph showing the interior of a heat hardened pellet according to present inventions, the pellet being ready for use as blast furnace, feed and the photograph having been taken of an image magnified six times.
FIG. 2 is a photograph showing the interior of a heat hardened pellet according to a preferred embodiment of the present invention, the pellet being ready for use as blast furnace feed, and the photograph having been taken of an image magnified six times.

With reference to FIGS. 1 and 6, a process will be described that can be performed on the apparatus of FIG. 6 to produce a pellet as shown in FIG. 1. FIG. 1 is labeled to point out the core, outer coating and a shadow that evidences the degree of slag containment within the pellet and the slight degree of bleeding of slag from the pellet. This figure will be discussed at greater length after first describing a process and apparatus shown in FIG. 6.

FIG. 6 shows a hopper 1 which is a storage container for a mixture of iron ore and flux, which may be as in an example previously referred to in the proportion of 32% of flux to 68% iron ore by weight. The ore and flux in hopper 1 may be funneled out at a controlled rate to a conveyer 2 that delivers this material to a balling drum 3. Balling drum 3 is mounted on an incline for rotation (by means not shown) about its central axis. A water delivery pipe 4 is provided to spray water upon finely divided ore and flux in the drum 3. Small droplets of water falling into the finely divided particles of solid material form small cores that roll down the incline of the drum 3 as the drum rotates. These small cores grow larger as they roll through the drum. The rate of feed, the slope of the balling drum, the rate of rotation of the drum and the quantity of water delivered in the form of a spray within the drum are the design parameters that must be coordinated to provide the desired core formation within the drum 3. The cores discharged from drum 3 are screened to provide the desired size, as for example, a diameter of ⅜ inch. This sizing may be accomplished by depositing the cores discharged from drum 3 on a screening device 5 that delivers properly sized cores to a conveyer 6 and discharges undersize cores to a conveyer 7. Undersize pellets deposited on the conveyer 7 may be recycled through the system so that this material is ultimately used in the system.

A coating of flux-free ore is packed about the cores to provide a composite pellet, by delivering the properly sized cores on conveyer 6 to a reroll drum 10. A hopper 11 provides a supply of flux-free iron ore which is funneled in controlled amounts to the reroll drum 10. The flux-free ore is distributed evenly throughout the entire length of the reroll drum 10 by a screw conveyer 12 mounted within a tube 13. The tube 13 is provided with openings 14 along its entire length to deposit material in the reroll drum along its entire length. Within this reroll drum 10 the flux-free ore is packed in the form of an outer coating around the cores previously formed in the balling drum 3. As mentioned earlier, the flux-free ore is packed about the cores to the degree that the outer coating is permeable to water vapor that must be driven off (as will be explained later) and also permeable to carbon dioxide gas that will be generated during subsequent steps in the treatment that will be described. However, the outer coating must be packed to be substantially impermeable to liquids of the viscosity of molten slag (at approximately 2200–2400 degrees Fahrenheit) that will also be formed later in the process. A water delivery pipe 15 is provided within the reroll drum which may add moisture to the flux-free ore delivered from the hopper 11. The moisture, if introduced into the reroll drum, must also be introduced along the entire length of the reroll drum and must be sprayed into the drum in an even finer spray than the water that is introduced to the balling drum 3. The reason that the moisture introduced into the reroll drum must be in the form of a very fine spray is that although it may be desired to increase the moisture content of the material in the reroll drum 10, it is not desired that additional cores be formed within that drum. It is only desired that outer coatings be applied to the cores previously formed in drum 3. The design parameters for achieving a coating of, for example, a thickness of 1/16 inch and within the permeability limits just described may include the rate of feed to the reroll drum, the slope of the drum, the speed of rotation, and the moisture content of the coating material in the reroll drum. These parameters can be coordinated to provide a coating on the cores that will be within the limits of permeability that have been described.

The composite pellets formed by applying an outer coating in reroll drum 10 to the cores that were formed in balling drum 3, may be discharged from the reroll drum 10 to a screening device 17 that sizes the composite pellets to the desired size as per the example previously referred to, one-half inch in diameter. The proper composite pellets are discharged from the screening device 17 to a conveyer 18 that carries the pellets to a treating furnace 20.

The treating furnace 20 shown in FIG. 6 comprises a traveling grate 21 and hood structure 22 including internal baffling means that define a drying chamber 24 (temperature about 500 degree Fahrenheit), a burning chamber 25 (temperatures approximately 2200–2400 degrees Fahrenheit) and a cooling chamber 26. Below the drying and burning chambers 24 and 25 is a suction chamber 30 and below the cooling chamber 26 is a wind box 31 supplied with cooling air as by a fan or blower (not shown) connected with a suitable opening 32. Cooling air entering wind box 31 through the opening 32 will pass upwardly through the grate 21 and the pellets thereon into the cooling chamber 26. The cooling air passing through the previously burned pellets will itself become preheated and this air which is now preheated is drawn out of cooling chamber 26 through a conduit 35. Conduit 35 is provided with branches 36, 37 leading to the burning and drying chambers 25, 24, respectively. The preheated air flowing from conduit 35 into branch 36 provides preheated air for supporting combustion of fuel introduced into the burning chamber 25 through a nozzle 40. Preheated air also flows through the branch 37 into the drying chamber 24. Air and air plus combustion gases are drawn downwardly through the grate in chambers 24 and 25 into wind box 30. An opening 41 is provided in wind box 30 that leads to a conduit 42 connected to an exhaust fan (not shown).

At this point the operation of the apparatus thus far described will be summarized and this will be followed by reference to the pellet thereby produced as shown in FIG. 1. A mixture of finely divided iron ore and flux material in the hopper 1 is funneled to conveyer 2. The conveyer 2 delivers this material to the balling drum 3. A fine spray of water, injected into balling drum 3 by the water delivery pipe 4, distributes fine droplets of moisture throughout the entire length of the balling drum. Each of these little droplets of water falling into the finely divided material delivered to drum 3 forms a tiny core that is caused to roll by the rotation of drum 3. As this tiny core rolls in the finely divided material it picks up additional material and grows to a larger and larger diameter size. The various design parameters previously referred to will have been chosen to provide a core of desired size for use as a core in the composite pellet being formed by this apparatus and the process. These cores are discharged from the balling drum 3 to the screening device 5 so that the cores deposited upon the conveyer 6 are of nearly uniform size. The conveyer 6 deposits the cores into the reroll drum 10. The hopper 11 funnels finely divided flux-free iron ore into the rotating reroll drum 10. The various design parameters previously referred to will have been selected to achieve operation of the reroll drum to pack an outer coating of the flux-free iron ore around each core. The composite pellets thus formed are discharged from the reroll drum 10 to the screening device 17 to in turn deposit selected size composite pellets on the conveyer 18. The thusly formed green water bound composite pellets are placed upon the traveling grate 21 and transported as a body of pellets with individual pellets at rest within the body, through the zones 24, 25 and 26. As the pellets pass through these zones they will be dried, preheated, burned to provide a strong pellet and finally cooled to handling temperatures. Care must be taken that the wet pellets are dried and preheated slowly enough that water vapor (given off during drying) and carbon dioxide gas (given off during preheating) may escape through the outer coating of the pellet without fracturing the pellet coating.

A pellet, such as may be made commercially by the foregoing process and apparatus, is shown in FIG. 1. The pellet shown in FIG. 1 was cast into a block of lucite plastic and then was cut in half and photographed at a 6 power magnification. FIG. 1 shows the final composite pellet that has been heat treated to provide sufficient strength in the outer coating of the pellet to withstand the handling necessary to transport and charge the pellet to a blast furnace. The particular pellet shown in FIG. 1 was made according to the example previously referred to, that is, with a core 3/8 inch in diameter surrounded by an outer coating of flux-free iron ore 1/16 inch thick. In order to cause the outer coating to have the desired strength, this pellet was heated to a temperature at least about 2200 degrees Fahrenheit but not more than 2450 degrees Fahrenheit. The temperature of the final treatment of the pellet is held to a temperature below about 2500 degrees Fahrenheit. Most iron ores reach a temperature of incipient fusion at about 2500 degrees Fahrenheit. At this temperature, if the pellet were permitted to reach it, the impurities even in the flux-free outer coating will form a liquid slag. After cooling, this would provide a slag bond (i.e., calcium silicate) that would provide a pellet of higher strength but with several disadvantages. First of all, a liquid phase near the exterior of the pellet is just what this invention is trying to avoid. Such a liquid state leading to slag bonding results in low porosity (few internal voids) and consequently is more difficult to reduce in a blast furnace. Further, slag bonding at the exterior of the pellet leads to extensive sticking together of adjacent pellets into clusters and may then also build up a deposit on the internal surface of heating furnaces. Within the temperature ranges referred to, the outer coating will achieve great strength by intergranular bridging of hematite grains, in the solid state. This reaction will take place between about 2200 degrees Fahrenheit and about 2450 degrees Fahrenheit. Such bridging of grains in the outer coating will not only provide the strength sought but will also have greater abrasion resistance than the harder but more brittle slag bonding that would take place as a result of higher temperatures. Within the temperature range referred to, however, the material within the core of the pellet, since it contains flux material, will enter a liquid phase, most frequently between 2200 degrees and 2270 degrees Fahrenheit. Thus the liquid phase occurs only in the core and the techniques and apparatus described make it possible to substantially contain this liquid phase within the pellet. The degree to which this liquid slag formed in the core of the pellet penetrates the outer coating is evidenced in FIG. 1 by the clearly visible shadow. It should be noted that this shadow indicates that the liquid slag is substantially contained within the pellet with very little bleeding to the surface of the composite pellet. The photograph of FIG. 1 shows the pellet in the position that was carefully maintained during its heat treatment. Thus, the lower part of the pellet indicates slightly greater slag penetration to the periphery as the result of gravitational forces exerted downwardly on the liquid. The amount of actual penetration through the outer coating was obviously slight and this amount in many cases may not be commercially objectionable. The relatively slight bleeding of liquid slag through the outer coating can also be seen from a study of FIG. 1 with reference to the small nub 45 shown on the upper lefthand side of the pellet of FIG. 1. This nub 45 joined the pellet shown with another pellet not shown but which was heat treated at the same time as the pellet shown and in a position slightly higher and to the left of the pellet shown. Thus physical contact between the outer shell of the pellet shown and another pellet treated at the same time existed and a slight bleeding through of slag from the upper pellet, not shown, to and into contact with the pellet of FIG. 1 resulted in the forming of a bond at 45. This bond was relatively weak and the two pellets broke apart easily after they were removed from the furnace. A slight tendency to stick together in this manner may not be of serious commercial concern because of the ease with which the pellets can be broken apart. Perhaps most such bonds will be broken merely in the normal course of handling the pellets. If any such bonds between pellets do not fracture through normal handling, any of the cluster breakers well-known in this art would be more than adequate to do the job and insure the production of individual discreet pellets.

The embodiment of the invention just described represents substantial and important advances in the state of this art. However, the embodiment of the inventions that will be next described represents even greater and more important advances in this art. This embodiment of the invention will be described with regard to FIGS. 2, 3, 4, 5 and 7. A brief glance comparing the pellet of FIG. 1 to the pellet of FIG. 2 will indicate the degree of further improvement attained by the embodiment that will now be described. Additional reference will be made to the pellet of FIGS. 2 through 5, inclusive, later in this discussion. However, it can be seen that the pellet of FIG. 2 shows a much more complete containment of slag within the pellet that results in a very sharp, clear cut, well defined line between the core and the outer coating of that pellet. More will be said with regard to the photographs after the discussion of FIG. 7 that follows.

With reference first to FIG. 7, an apparatus is shown having a hopper 51, conveyer 52, balling drum 53, screening device 55, conveyers 56 and 57, reroll drum 60, hopper 61, screening device 67 and conveyer 68. All of these aforementioned pieces of equipment are all similar in construction and arrangement to the pieces of equipment numbered 1 through 18 in FIG. 6. The raw feed will be handled in a similar fashion. That is, ore and flux similarly prepared and proportioned will be funneled from the hopper 51 to the conveyer 52. The conveyer 52 will deliver the ore and flux to the balling drum 53 where cores for a composite pellet will be formed and deposited on a screening device 55. Properly sized cores deposited on the conveyer 56 will be delivered to a reroll drum 60. An outer coating will be packed around the cores to the degree that will permit the escape of water vapor and carbon dioxide gas but the substantial containment of more viscous liquids such as liquid slag (at 2200–2400 degrees Fahrenheit). Such composite pellets will be deposited upon the conveyer 68 for delivery to a treating furnace 70.

It is at this point that the present embodiment of the invention differs substantially from the previously described embodiment. The furnace 70 is substantially different in kind and operation from the furnace 20 of FIG. 6. The heat treating process and the product thereof are also different as will be pointed out in detail as the description proceeds.

The treating furnace 70 includes structures that define four separate treating zones. Hood structure 72 and internal baffling 73 define three zones 74, 75 and 76 while a rotary kiln 77 defines the fourth zone numbered 78. Zone 74 is a preliminary drying zone, zone 75 a final drying zone (temperatures about 500–900 degrees Fahrenheit), zone 76 a preburning zone (temperatures up to approximately 1600–1800 degrees Fahrenheit), and the fourth and final zone 78 is a final burning zone (temperatures up to approximately 2200–2400 degrees Fahrenheit). The structure shown that will be described as defining such zones is particularly capable to handle green water bound pellets fed to this furnace in a very wet condition. In many, if not most installations, the predrying zone 74 may not be required. To describe apparatus capable of operation under the most adverse conditions, the furnace 70 will be described as including the predrying zone 74.

Composite pellets from the conveyer 68 are carried through the three zones within the hood 72 by a gas permeable conveyer 81. Pellets are deposited on the conveyer 81 in the same manner that they are deposited on conveyer 21 in FIG. 6. That is, these pellets move as a body through zones 74, 75 and 76 with individual pellets being, relatively speaking, at rest within this moving body. From the conveyer 81, the pellets are discharged down an incline 82 and are fed into the rotary kiln 77. Pellets are discharged from the kiln 77 into a cooling device such as shown at 83. There are many types of cooling devices that can be used depending on the size of the installation. The cooling device 83 is of relatively simple construction and may be adequate for relatively small operations. Other well-known types of coolers will be used for large installations. The cooler shown comprises a rotating, vertical shaft 84 that contains a downwardly moving column of pellets discharged from kiln 77. A blower 85 blows cooling air upwardly through the descending column of pellets to cool the pellets and preheat the ascending air which is admitted to the firing hood 86 of the kiln 77. Pellets discharged from the lower end of the cooler 83 may be transported away from the installation as desired.

A burner 90, projecting through burner hood 86, provides for a flame within the kiln 77. Hot gases proceed through the kiln 77 and the zone 78 defined therein and pass into zone 76 within the hood structure 72. From the zone 76 the hot gases are drawn downwardly through the pellets and the conveyer 81 into a suction box 91 below the grate. From the suction box 91 the hot gases pass through a conduit 92 to zone 75. Here the hot gases make a second pass downwardly through the pellets on the conveyer 81 and are collected in a second suction box 93. The hot gases pass from the second suction box 93 through a conduit 94 that leads these gases to a wind box 95 beneath zone 74. Here the hot gases pass upwardly through the pellets on the traveling grate 81 into zone 74 and they are exhausted through a conduit 96. The flow of gases may be promoted by such as an exhaust fan (not shown) arranged to draw gases out through conduit 96.

In the embodiment shown in FIG. 7 as previously mentioned, it is assumed that the pellets are quite wet and require two-stage drying. Thus, in an apparatus providing such two-stage drying, the wet pellets deposited upon the traveling grate 81 will move into and through zone 74. As the pellets pass through this preliminary drying zone warm gases will pass upwardly through the pellets on the grate and out conduit 96. When a preliminary drying zone is provided, as here shown, because of exceptionally wet pellets, it is preferred that the gases passing through the pellets in the first zone be directed in an upwardly direction rather than in a downflow direction as will be subsequently described for final drying and preburning. The reason for providing upflow preliminary drying in the first zone is that it is necessary to carry the maximum amount of water away from the pellets in the lower levels of the pellets on the grate and to do so as quickly as possible. If a downflow of gases were used in a first zone for preliminary drying of very wet pellets an even greater concentration of water would result at the bottom of the body of pellets and in this very wet environment the green, relatively weak pellets could be easily squashed. This would not only destroy the shape and composition that so much trouble has been gone to to provide, but also the permeability of the body of pellets on the grate would be destroyed and further gas flow could not find its way through the mass of pellets on the grate. For such reasons, therefore, an upward flow of gases through a first drying zone, when very wet pellets are handled, is preferred.

In a final drying zone 75 (which in many installations may be the first zone over conveyer 81) pellets are carried through the zone and drying gases are directed downwardly through the pellets on the traveling grate. Substantial drying of the pellets should be achieved before they are permitted to leave this zone. Thus by proper control of the speed of the conveyer 81 the pellets must be dried thoroughly but at a slow enough rate that will insure water vapor having an opportunity to get out of the pellet without fracturing the outer coating. Dry pellets are ready to be carried through the preburning zone 76.

Within the preburning zone the temperature of the pellets will be raised sufficiently so that any magnetite that is present in the iron ore will thermally convert to hematite. Such a conversion takes place at about or approximately between 1600 degrees Fahrenheit and 1800 degrees Fahrenheit. This transformation can be symbolically expressed by the formula $4Fe_3O_4 + O_2 \rightarrow 6Fe_2O_3$. Pellets entering the preburning zone 76, although dry, will have little physical strength. Sufficient physical strength must be imparted to these pellets within the preburning zone so that they can be discharged to the final burning zone where they are tumbled. By the time the pellets in zone 76 reach 1600 degrees Fahrenheit any magnetite that is present will be at least superficially oxidized to hematite. The heating of particles of hematite in this temperature range causes individual grains of hematite in the outer coating to begin to bridge together by grain growth and intergranular bridging in the solid state without any reaction with any of the available silica or flux (flux is available only in the core). After individual grains have so begun to bridge together in the outer coating but before a complete network of such bridged grains is completed the body of pellets in zone 76 is disrupted and discharged into the zone 78 within the kiln 77 wherein they are tumbled during their final heat treating. It will be shown later with reference to photographs in the drawing how this bridging can be recognized. While the apparatus and process should be so controlled to insure the beginning of such bridging, it is also important that the body of pellets be disrupted before the complete network of bridged grains is achieved. A densified outer coating around the core to practically completely contain any liquid slag within the pellet is achieved only if the final building of this network is caused to occur while the pellets are rolling and tumbling within the kiln 77. The temperatures required to convert magnetite to hematite and initiate the bridging of grains to give the pellets sufficient strength to withstand rolling and tumbling is not quite high enough to cause the liquid phase of the slagging constituents to occur. If the rolling and tumbling of the pellets are begun before the bridging of grains is completed and before the liquid phase of the slagging constituents is reached, then the vastly superior pellet shown in FIG. 2 is achieved. By the rolling action imparted to the pellet, the gravitational force exerted on the liquid slag that would tend to pull the slag through the outer coating (as it did in the case of the pellet of FIG. 1), is not concentrated at any one spot but rather is neutralized as the pellet rolls. By this rolling action, the effect of gravity is neutralized and, as will be shown with regard to microphotographs, practically none of the liquid slag finds its way out of the inner core. At the same time that the force of gravity is thus being neutralized by the rolling action of the pellet, the rolling and tumbling action of the pellet further results in the densification of the outer coating of the pellet because the pellet is exposed to a pounding action while the network of bridged grains is still forming. Once the network has been completed it is then too late to achieve this densification. Thus, the importance of the proper timing of the transfer of pellets from the grate to the kiln can be appreciated. These phenomena, that have so far been discussed with regard to the apparatus shown in FIG. 7, will now be discussed with regard to the microphotographs of FIGS. 2 through 5.

FIG. 2 is a picture taken of an image magnified six times and the pellet so photographed was initially made to the same approximate dimensions as the one shown in FIG. 1, that is a ⅜ inch core surrounded by a ¹⁄₁₆ inch outer coating. This pellet shown in FIG. 2 clearly shows the high degree of liquid slag containment within the inner core that has been achieved and also shows the densification of the outer coating. The outer coating of the pellet shown in FIG. 2 was originally just as thick as the outer coating of the pellet shown in FIG. 1. FIG. 2 shows clearly, however, that this outer coating has been densified so that it is substantially thinner than the outer coating in FIG. 1. Pilot plant operations established that practically no fines were discharged from the kiln, therefore giving strong evidence that this reduction of the thickness of the outer coating is in fact due to densification and not to any wearing off of material by abrasion from the outer coating. To show even more clearly the clear line of demarcation between the inner core and the outer coating and the lack of penetration of slag from the inner core to the outer coating, the photograph of FIG. 3 was taken of the same pellet shown in FIG. 2 but magnified to 100 times rather than six times as was the case with FIG. 2. This photograph in FIG. 3 shows the very clear line of demarcation between the outer coating of flux-free iron ore and the core of iron ore and flux.

Figure 3:
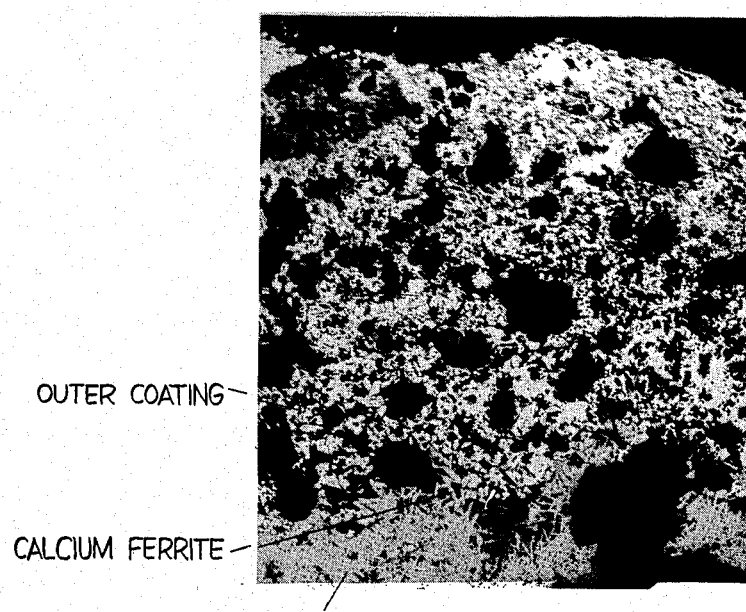
FIG. 3 is a photograph of the pellet of FIG. 2 but this photograph is one having been taken of an image magnified 100 times.
Figure 5:
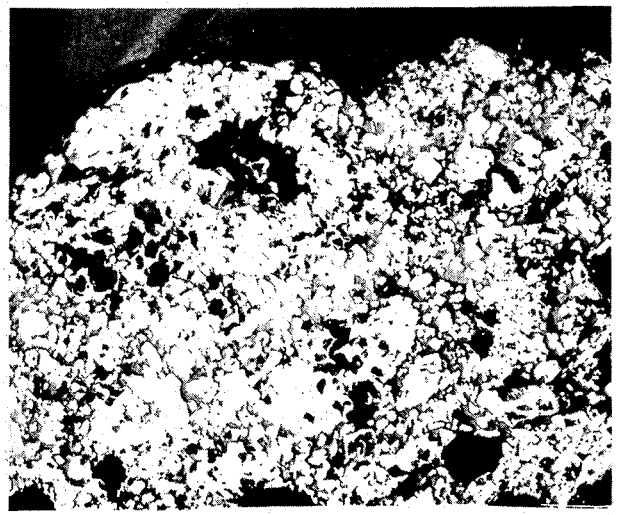
FIG. 5 is a photograph of the pellet of FIG. 2 showing only the coating, this photograph being of an image magnified 200 times.

FIG. 5 is a photograph taken of only the outer coating portion of the pellet shown in FIGS. 2 and 3 and to a magnification of 200 times. At this magnification, the intergranular bridging of grains of hematite in the outer coating is clearly visible. Although a three dimensional photograph cannot be reproduced or even taken for that matter, even in two dimensions, FIG. 5 shows how a substantially complete network of bridged grains is formed to provide the desired pellet strength. Thus FIG. 5 clearly shows what the bridging of grains looks like and therefore will clearly indicate to one skilled in the art how he will know when the pellets should be taken from the conveyer 81 and discharged into the kiln 71, that is, the heat treatment in zone 76 should progress without tumbling the pellets until the bridging of grains begins but not until it is substantially complete as shown in FIG. 5. After that minimum condition is reached but before the complete network is achieved the pellet should be discharged into the tumbling zone where such a network can continue to develop to completion with the attendant advantages described.

Figure 4:
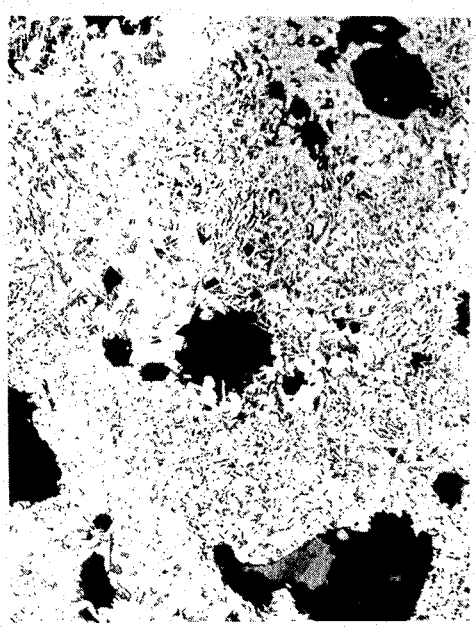
FIG. 4 is a photograph of the pellet of FIG. 2 showing only the core, this photograph being of an image magnified 200 times.

FIG. 4 is a photograph that was taken of the core of the pellet shown in FIGS. 2 and 3 but magnified 200 times. FIG. 4 and also FIG. 3 clearly show the needle configuration that indicates the presence of calcium ferrites rather than iron silicates. This is a very important accomplishment of the present invention because ferrites (calcium and magnesium ferrite) are easily and quickly reduced in a blast furnace thus releasing the flux to combine with the silicates found in the outer coating of the pellet. Iron silicates on the other hand are difficult to reduce in the blast furnace. While the exact mechanism of this important accomplishment and contribution to the art is not completely understood by the inventors, it is the inventors' theory that ferrites are formed rather than iron silicates because of the great excess of flux in the inner core. While enough flux is put in the inner core to flux the silica found not only in the inner core but also in the outer coating (and the siliceous component of the coke charged to a blast furnace) as well, the silica is distributed throughout the composite pellet which means that only about perhaps 30 to 35 percent of the silica will be found in the inner core where 100 percent of the flux is placed. Further, it is important that the slagging flux (and its calcium) is so completely contained within the inner core and not permitted to penetrate the outer coating. Where flux, iron and silica are present in molten slag the silica (and aluminum too) will preferentially unite with flux rather than iron. But here in the core, silica will unite with calcium (in the flux) and there will be a considerable amount of calcium left over. This leftover calcium, having no more available silica seeking to unite with it, then unites with iron to form the desired calcium ferrite.

Thus it can be seen that the inventors have made significant and important advances in this art. Since the concepts and techniques that the inventors herein teach relate to novel articles of manufacture both in the form of green water bound pellets and heat treated and hardened pellets, process and apparatus concepts, and as a result many variations will perhaps occur to those skilled in the art that will be within the spirit of the inventions contributed by these inventors. It is not therefore intended that the inventions described should be limited to the particular examples discussed but rather that the inventions should be considered as defined only in the appended claims.

The embodiments of the invention in which an exclusive property or privilege is claimed are defined as follows:

1. For making a strong pellet from iron ore and flux material, the process comprising: mixing finely divided iron ore containing silica and iron oxides that will contain hematite when heated to approximately 1600 degrees Fahrenheit in an oxidizing atmosphere with a flux material which is a carbonate of an element from the group consisting of calcium and magnesium, in amounts to provide in the mixture at least twice as much of said carbonate as is required to flux the siliceous component of the iron ore in said mixture; rolling said mixture with moisture to provide a moist core of approximately ⅜ inch diameter forming a composite pellet by packing around said moist core an outer coating of moist iron ore of substantially the same composition as that of the core and free of added flux material and compressing said coating being packed about said core to the degree that said coating is approximately ⅟₁₆ inch thick and permeable to vapor of said moisture and a dioxide gas of the carbon in said carbonate, but impermeable to liquids of the viscosity of molten slag of said enclosed fluxed ore at approximately 2200–2400 degrees Fahrenheit; heating said pellet to vaporize said moisture and form carbon dioxide gas within said core but at a rate less than a rate observed to heat escaping vapor and gases to a pressure that will fracture said coating; and then after said vapor and gases have been driven off, further heating said pellet in an oxidizing atmosphere to a temperature above the drying temperature until there is in said core a combining of a majority of the silica with said element to leave only a minority of the silica to combine with a minority of the iron and the remaining majority of the iron to form a ferrite of said element and to effect in said coating a network of bridged hematite grains.

2. For making strong pellets from iron ore that will contain hematite when heated to approximately 1600 degrees Fahrenheit in an oxidizing atmosphere and flux material, the process comprising: mixing said ore in finely divided state and flux materials in proportions that provide by weight approximately 32 percent flux to 68 percent iron ore, adding moisture to said mixture and rolling same to form a moist core of approximately ⅜ inch diameter; forming a composite pellet by packing around said moist core an outer coating of said iron ore while moist and free of added flux material and compressing said coating being packed about said core to the degree that said coating is approximately ⅟₁₆ inch thick and permeable to vapor of said moisture but impermeable to liquids of the viscosity of molten slag of said enclosed fluxed ore at approximately 2200–2400 degrees Fahrenheit; establishing at least first, second and third pellet heating zones; forming said composite pellets into a movable gas permeable body with said pellets at rest relative to each other within said body, conveying said body of pellets through said first zone to heat said pellets to vaporize and drive off said moisture at less than a rate that is observed to heat escaping vapor to a pressure that will fracture said coating; conveying said body through said second zone to further heat said pellets in an oxidizing atmosphere to initiate bridging of adjacent grains of hematite; and then before a continuous network of bridged hematite grains is achieved throughout the coating of each pellet, disrupting said body of pellets and tumbling said pellets through said third zone while heating said tumbling pellets to a range above the temperatures of said first and second zones but below the incipient melting temperature of the ore in said coating, until bridging of said hematite grains yields a network throughout the coating of each pellet.

3. For making strong pellets from iron ore that will contain hematite when heated to approximately 1600 degrees Fahrenheit in an oxidizing atmosphere and flux material, the process comprising: agglomerating a mixture free of carbonaceous fuel and consisting of moisture, said iron ore in finely divided state and carbonate flux material to provide a moist core with said flux being by weight approximately 32 percent to 68 percent iron; forming a composite pellet by packing around said moist core an outer coating of said iron ore while moist and free of added flux material and free of carbonaceous fuel and compressing said coating being packed about said core to the degree that said coating is approximately ⅟₁₆ inch thick and permeable to vapor of said moisture and a dioxide gas of the carbon in said carbonate, but impermeable to liquids of the viscosity of molten slag of said enclosed fluxed ore at approximately 2200–2400 degrees Fahrenheit; establishing at least first, second and third pellet heating zones; forming said composite pellets into a movable gas permeable body with said pellets at rest relative to each other within said body; conveying said body of pellets through said first zone to heat said pellets to approximately 500–900 degrees Fahrenheit to vaporize and drive off said moisture at a rate less than a rate that is observed to heat escaping vapor to a pressure that will fracture said coating; conveying said body through said second zone to further heat said pellets to approximately 1600–1800 degrees Fahrenheit to initiate bridging of adjacent grains of hematite; and then before a continuous network of bridged hematite grains is achieved throughout the coating of each pellet, disrupting said body of pellets and tumbling said pellets through said third zone while heating said tumbling pellets to a range of approximately 2200–2400 degrees Fahrenheit but below the incipient melting temperature of approximately 2500 degrees Fahrenheit for the ore in said coating, until bridging of said hematite grains yields a network throughout the coating of each pellet.

References Cited by the Examiner
UNITED STATES PATENTS

| | | | |
|---|---|---|---|
| 2,750,272 | 6/1956 | Lellep | 75—3 |
| 2,925,336 | 2/1960 | Stowasser | 75—3 |
| 3,134,667 | 5/1964 | Holowaty et al. | 75—5 |

BENJAMIN HENKIN, *Primary Examiner.*